(12) United States Patent
Su et al.

(10) Patent No.: US 8,737,331 B2
(45) Date of Patent: May 27, 2014

(54) METHOD FOR ALLOCATING RADIO RESOURCES OF A PUCCH AND RADIO RESOURCE MANAGER

(75) Inventors: Xiaoming Su, Shenzhen (CN); Wenfang Wang, Shenzhen (CN); Yujie Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 134 days.

(21) Appl. No.: 13/255,084

(22) PCT Filed: Jun. 4, 2010

(86) PCT No.: PCT/CN2010/073551
§ 371 (c)(1),
(2), (4) Date: Sep. 6, 2011

(87) PCT Pub. No.: WO2011/109968
PCT Pub. Date: Sep. 15, 2011

(65) Prior Publication Data
US 2012/0063411 A1  Mar. 15, 2012

(30) Foreign Application Priority Data
Mar. 10, 2010 (CN) .......................... 2010 1 0134397

(51) Int. Cl.
*H04W 4/00* (2009.01)
(52) U.S. Cl.
USPC ....................................................... 370/329
(58) Field of Classification Search
USPC .............. 370/329, 330, 310, 310.2, 328, 331, 370/431
See application file for complete search history.

(56) References Cited

U.S. PATENT DOCUMENTS

| 2009/0279493 | A1* | 11/2009 | Gaal et al. | 370/329 |
| 2010/0291937 | A1* | 11/2010 | Hu et al. | 455/450 |
| 2011/0274071 | A1* | 11/2011 | Lee et al. | 370/329 |
| 2011/0317653 | A1* | 12/2011 | Kwon et al. | 370/329 |

FOREIGN PATENT DOCUMENTS

| CN | 1549478 A | 11/2004 |
| CN | 1819544 A | 8/2006 |
| CN | 1878145 A | 12/2006 |
| CN | 1893682 A | 1/2007 |
| CN | 101325791 A | 12/2008 |

(Continued)

OTHER PUBLICATIONS

PCT International Search Report for PCT/CN2010/073551 dated Dec. 16, 2010.

(Continued)

*Primary Examiner* — Anh Ngoc Nguyen
(74) *Attorney, Agent, or Firm* — Nixon Peabody LLP; Joseph Bach, Esq.

(57) ABSTRACT

The present invention discloses method for allocating radio resources of a physical uplink control channel (PUCCH) and a radio resource manager, wherein the method includes: a radio resource manager generating a resource pool; the radio resource manager sorting PUCCH resources in the resource pool according to a generating sequence thereof, and making a pointer point to a first PUCCH resource; and the radio resource manager allocating a PUCCH resource pointed by the pointer currently to a terminal and then making the pointer point to a next PUCCH resource. The present invention has the advantage that it is unnessesary to perform a resource search at each allocation of resource, the time for searching resources is saved, the resource search is simplified, and the complexity of a system is reduced greatly.

9 Claims, 2 Drawing Sheets

(56) References Cited

FOREIGN PATENT DOCUMENTS

| CN | 101651986 A | 2/2010 |
| WO | 2009118285 A2 | 10/2009 |
| WO | WO 2009123549 A2 | 10/2009 |

OTHER PUBLICATIONS

Chinese Examination Report for Application No. 201010134397.5, mailed on May 14, 2013.

* cited by examiner

METHOD FOR ALLOCATING RADIO RESOURCES OF A PUCCH AND RADIO RESOURCE MANAGER

CROSS-REFERENCE TO RELATED APPLICATIONS

This application is a National Phase of International Application No. PCT/CN2010/073551, which was filed on Jun. 4, 2010, and which claims priority to and the benefit of Chinese Patent Application No. 201010134397.5, filed on Mar. 10, 2010, and the disclosures of which are hereby incorporated herein by reference in their entireties.

FIELD OF THE INVENTION

The invention relates to the communication field, and in particular to a method for allocating radio resources of a physical uplink control channel (PUCCH) and a radio resource manager.

BACKGROUND OF THE INVENTION

In long term evolution (LTE), a PUCCH can be divided into two categories which include six types in total: the first category comprises three formats, i.e., format1, format1$a$ and format1$b$, and the second category comprises three formats, i.e., format2, format2$a$ and format2$b$. The PUCCH of the first category is used to transmit a scheduling request (SR), an acknowledge (ACK) and a non-acknowledge (NACK) signaling, wherein the format1 is used to transmit the SR, the format1$a$ is used to transmit the ACK/NACK of a single code word stream, and the format1$b$ is used to transmit the ACK/NACK of a double code word stream. The PUCCH of the second category is mainly used to transmit a channel quality indicator (CQI), wherein the format2 is only used to transmit the CQI, the format2$a$ is used to transmit the CQI and the ACK/NACK of the single code word stream simultaneously, and the format2$b$ is used to transmit the CQI and the ACK/NACK of the double code word stream simultaneously. The number of resource blocks (RB) occupied by the format1$a$ and the format1$b$ of the PUCCH of the first category in a first slot relates to the number of downlink control channel elements (CCE), which is dynamically changed; and the number of RBs occupied by the format1 of the PUCCH of the first category and the PUCCH of the second category is allocated to a user equipment (UE) by a radio resource manager of a base station when the UE accesses a network.

At present, a solution for allocating radio resources in the PUCCH is provided in the prior art; taking the allocation of SR resources in the PUCCH as an example, the implemented process thereof is as follows.

At first, the radio resource manager of the base station generates a resource pool; and when the UE accesses the network, the radio resource manager searches the resource pool to search out a resource which is not used, allocates the resource to the UE, and sets the resource as in a used state. When the UE releases the resource, the radio resource manager sets the resource as in an unused state.

However, the above solution for allocating resources has the following defects that the demodulation performance of the PUCCH is not optimal because the demodulation performance of the PUCCH relates to the position of the used resource, and the above method for allocating resources adopts a method of a sequential allocation or a random resource allocation. Besides, the above solution for allocating resources has a deficiency that when a resource is allocated to one UE each time, the searching is required to be performed from the beginning until an unused resource is searched out, therefore, the resource pool needs to be searched continually, and the complexity of the system is increased.

SUMMARY OF THE INVENTION

The main object of the present invention is to provide a method for allocating radio resources of a PUCCH and a radio resource manager, so as to at least solve the above problems.

According to one aspect of the present invention, a method for allocating radio resources of a physical uplink control channel (PUCCH) is provided and includes: a radio resource manager generating a resource pool; the radio resource manager sorting PUCCH resources in the resource pool according to a generating sequence thereof, and making a pointer point to a first PUCCH resource; and the radio resource manager allocating a PUCCH resource pointed by the pointer currently to a terminal and making the pointer point to a next PUCCH resource.

According to another aspect of the present invention, a radio resource manager is provided and comprises: a resource pool generating module, configured to generate a resource pool; a sorting module, configured to sort physical uplink control channel (PUCCH) resources in the resource pool according to a generating sequence thereof and make a pointer point to a first PUCCH resource; and an allocating module, configured to allocate a PUCCH resource pointed by the pointer currently to a terminal and make the pointer point to a next PUCCH resource.

In the present invention, the radio resource manager points, by setting the pointer, the pointer to the next PUCCH resource after allocating one PUCCH to the UE, and when the resources are allocated to the next UE, all that is needed is to allocate the PUCCH resource pointed by the pointer currently to the UE, so that the problems in the prior art that the resource pool needs to be searched continually, and the complexity of a system is increased are solved; therefore, it is unnecessary to perform a resource search at each allocation of resource, the time for searching resources is saved, the resource search is simplified, and the complexity of a system is reduced greatly; and resources are generated according to an optimum sequence, so that the demodulation performance of the PUCCH is improved.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention will be described in details with reference to the drawings and in combination with the embodiments hereinafter, it needs to be explained that the embodiments of the present application and the features thereof can be combined with each other if there is no conflict.

Figure 1:
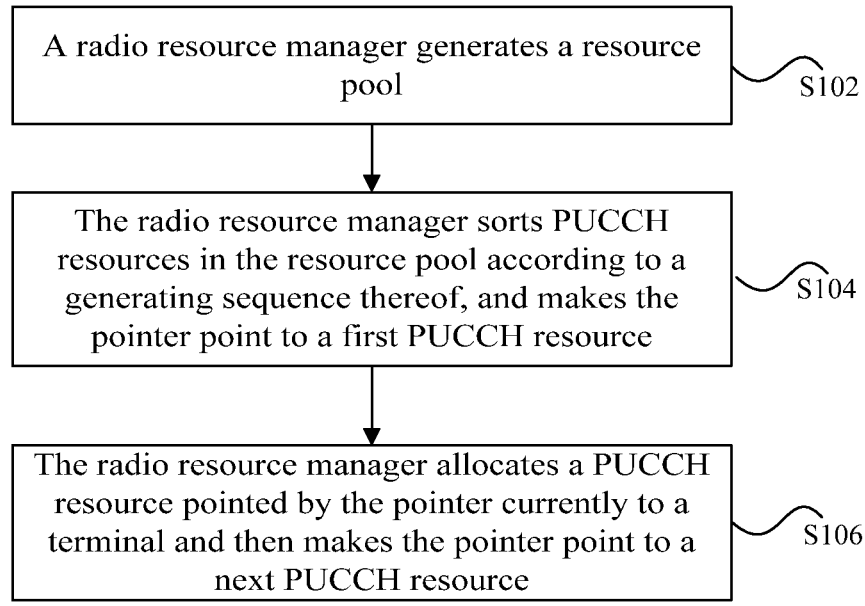
FIG. 1 is a flow chart of a method for allocating radio resources of a physical uplink control channel according to an embodiment of the present invention.

FIG. 1 is a flow chart of a method for allocating radio resources of a physical uplink control channel according to an embodiment of the present invention, and the method comprises the following steps.

Step S102: a radio resource manager generates a resource pool.

Step S104: the radio resource manager sorts PUCCH resources in the resource pool according to a generating sequence thereof and makes a pointer point to a first PUCCH resource.

Step S106: the radio resource manager allocates a PUCCH resource pointed by the pointer currently to a terminal and makes the pointer point to a next PUCCH resource.

In the embodiment, the radio resource manager points, by setting the pointer, the pointer to the next PUCCH resource after allocating one PUCCH to the UE, and when the resources are allocated to the next UE, all that is needed is to allocate the PUCCH resource pointed by the pointer currently to the UE, so that the problems in the prior art that the resource pool needs to be searched continually, and the complexity of a system is increased are solved. By using the embodiment, it is unnecessary to perform a resource search at each allocation of resource, the time for searching resources is saved, the resource search is simplified, and the complexity of a system is reduced greatly; and resources are generated according to an optimum sequence, so that the demodulation performance of the PUCCH is improved.

Preferably, the Step S102 includes that the radio resource manager combines code division resources, frequency division resources and time division resources of a PUCCH so as to generate the resource pool.

In the above, the step that the radio resource manager combines the code division resources, the frequency division resources and the time division resources of the PUCCH so as to generate the resource pool includes that the code division resources, the frequency division resources and the time division resources which are corresponding to a signaling type are combined according to the following formula so as to generate PUCCH resources S: $S=R*T*U+T*U+U$, or $S=T*R*U+R*U+U$, wherein R is the frequency division resources, T is the time division resources, U is the code division resources, and S is the PUCCH resources; and all the generated PUCCH resources S forms the resource pool.

The embodiment provides a specific implementation solution that the radio resource manager generates the PUCCH resources to form the resource pool. The radio resource manager combines, according to a method with an optimal performance, the code division resources, the frequency division resources and the time division resources to generate the PUCCH resources S in turn, and allocates the resources according to the generating sequence of the resources, so that the problem existed in the prior art that the demodulation performance of the PUCCH is not optimal is further solved, a cross allocation of the resources is realized, and the demodulation performance of the physical uplink control channel can be improved.

Preferably, the Step S104 includes that the radio resource manager sorts the PUCCH resources in the resource pool according to the generating sequence of the resources, numbers the sorted PUCCH resources according to a monotone sequence (for example, a monotone increasing sequence or a monotone decreasing sequence), and makes the pointer point to a PUCCH resource whose number is an initial number.

The preferred embodiment provides a specific implementation solution that the radio resource manager numbers each of the PUCCH resources according to the generating sequence.

Preferably, the above method also comprises that the terminal releases the PUCCH resource; and the radio resource manager places the released PUCCH resource in a recovery pool so as to be prepared for a following resource recovery. The recovery pool is storage space which is allocated in advance and used to store resources released by terminals.

Preferably, the above method also comprises that when the amount of PUCCH resources remained in the resource pool reaches a predetermined amount, the radio resource manager sorts the PUCCH resources in the recovery pool according to a monotone sequence of the numbers thereof and then merges the sorted PUCCH resources in the recovery pool into the resource pool.

The embodiment provides a specific implementation solution for resource recovery. When the resources remained in the resource pool reaches the predetermined amount, the resources in the recovery pool can be merged into the resource pool for being reused, so that the resources of the physical uplink control channel is not wasted, and the demodulation performance of the physical uplink control channel in the system is enabled to be optimal.

In the above, the step that the radio resource manager merges the sorted PUCCH resource into the recovery pool includes that the radio resource manager places the sorted PUCCH resource in the recovery pool before a PUCCH resource which is in the resource pool and is pointed by the pointer currently, and makes the pointer point to a first PUCCH resource in the merged resource pool.

In the preferred embodiment, the sorting is performed before the merging, therefore, the sorted PUCCH resources in the recovery pool can be directly placed before the pointer, and the pointer is redirected to point to the first resource in the merged resource pool, so that the purpose of reusing the released resource can be achieved, and the demodulation performance of the physical uplink control channel in the system can be optimal.

In the above, the way of judging whether the amount of the PUCCH resources remained in the resource pool reaches the predetermined value is to judge whether the number of the PUCCH resource pointed by the pointer currently reaches a predetermined number.

The embodiment provides a specific implementation solution for judging whether the amount of the PUCCH resources remained in the resource pool reaches a predetermined value. For example, the PUCCH resources in the resource pool is numbered from 1 according the monotone increasing sequence; when the total amount of the PUCCH resources is N (the maximum number is also N at this time), the above predetermined amount can be [N/2] ([ ] is a round-off symbol), and the above predetermined number can be [N/2]. Specifically, when the total amount of the PUCCH resources in the resource pool is 120, the predetermined amount is 60, and the predetermined number is 60; and when the total amount of the PUCCH resources in the resource pool is 121, the predetermined amount is 60, and the predetermined number is 60.

The PUCCH resources allocated to UE by the radio resource manager ensures that a control channel of a base station has a better demodulation capability, the resource search is simple, and the resource of the control channel is not wasted.

The specific implementation steps of the method for allocating the radio resources of the physical uplink control channel of the present invention are as follows.

Step 1: the radio resource manager generates the resource pool according to a combination of a code division, a frequency division and a time division, numbers each of the resource according to the monotone sequence, and makes the pointer point to an initial number resource.

Step 2: when resources are required to be allocated to a UE, the following operation is performed: the radio resource manager allocating the resource that is in the resource pool and pointed by the pointer to the UE, and moving the pointer to the next resource.

Step 3: when a certain UE releases a resource, the following operation is performed: the radio resource manager placing the resource to the recovery pool.

Step 4: when the pointer points to some certain specific positions in the resource pool, resources are merged in the following way: the radio resource manager sorting resources in the recovery pool as per the sequence numbers of the resources according to the monotone sequence in the Step 1, placing the sorted resource before a resource that is in the resource pool and pointed by the pointer, and makes the pointer point to a initial resource of the merged resources.

Embodiment 1

Figure 2:
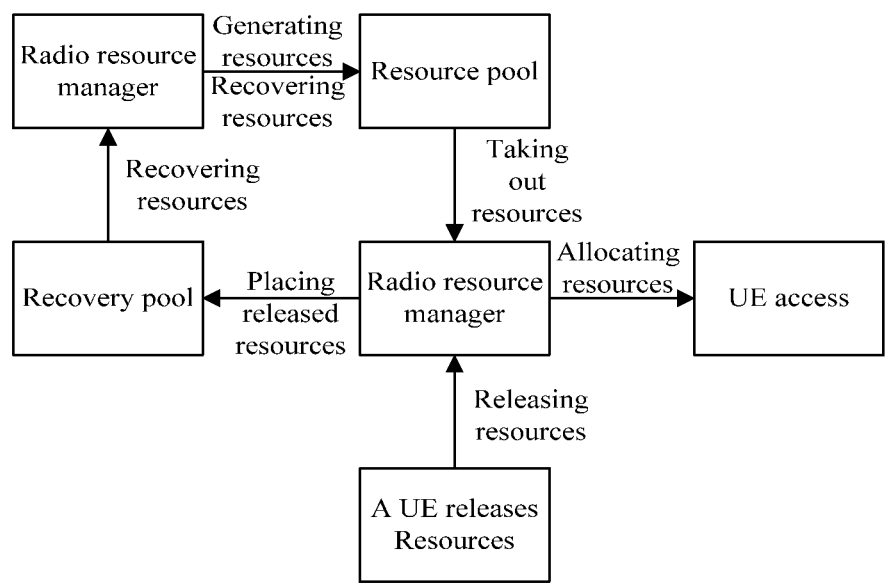
FIG. 2 is a flow schematic chart of a method for allocating radio resources of a physical uplink control channel according to a preferred embodiment of the present invention.

In a physical uplink control channel of a LTE, an eNodeB needs to allocate to an accessed UE resource for transmitting a CQI. As shown in FIG. 2, the following steps are comprised.

Step 1: a resource pool of the CQI is generated according to the following formula (1):

$$S=R*T*U+T*U+U \qquad (1)$$

wherein R is frequency division resources of the CQI, and can be 1, 2, 3 or 4; T is time division resources of the CQI, and can be 1, 2, 3 or 4; U is code division resources of the CQI, and can be 1, 2, 3, 4, 5, 6, 7, 8, 9, 10, 11 or 12; and all the values of R, T and U are traversed to obtain all the S so as to form the resource pool. The resources in the resource pool are numbered from 1 according to a monotone increasing sequence, and the pointer is pointing to a resource whose number is 1.

The value of the above R can be 1, 2, 3 and 4, which indicates that 4 resource blocks (RB) are selected from all available frequency division resources (RB) and are renumbered according to the order of the sequence numbers of the 4 RBs, and the numbers represent the resource blocks. For T and U, the operation is similar, which will not be repeated here and hereinafter.

In the above, when resources are generated, the frequency division resources, the time division resources and the code division resources are given values mixedly according to a sequence in conformity with an optimal demodulation.

Step 2, when a resource is required to be allocated to a UE, a resource pointed by the pointer is allocated to the UE, and then the pointer is pointed to a next resource.

Step 3, when one UE releases a resource, the radio resource manager places the resource released by the UE back to a recovery pool.

Step 4, when the sequence number of the resource pointed by the pointer equals to a half of the maximum sequence number N, i.e., [N/2], the resources in the recovery pool are sorted according to the order from small to large of the sequence numbers; the sorted resources are placed in the resource pool; and the pointer is pointed to a resource with a minimum sequence number among the sorted resources.

Embodiment 2

In a physical uplink control channel of a LTE, an eNodeB needs to allocate to an accessed UE resource for transmitting a SR. As shown in FIG. 2, the following steps are comprised.

Step 1: a resource pool of the SR is generated according to the following formula (2):

$$S=T*R*U+R*U+U \qquad (2)$$

wherein R is frequency division resources of the SR, and can be 1; T is time division resources of the SR, and can be 1, 2, 3 or 4; U is code division resources of the SR, and ranges from 1 to 18; and all the values of R, T and U are traversed to obtain all the S so as to form the resource pool. Resources in the resource pool are numbered from 1 according to a monotone increasing sequence, and the pointer is pointed to a resource whose number is 1.

In the above, when the resources are generated, the frequency division resources, the time division resources and the code division resources are given values mixedly according to a sequence in conformity with an optimal demodulation.

Step 2, when a resource is required to be allocated to a UE, a resource pointed by the pointer is allocated to the UE, and then the pointer is pointed to a next resource.

Step 3, when one UE releases a resource, the radio resource manager places the resource released by the UE back to a recovery pool.

Step 4, when the sequence number of the resource pointed by the pointer equals to a half of the maximum sequence number N, i.e., [N/2], the resources in the recovery pool are sorted according to the order from small to large of the sequence numbers; the sorted resources are placed in the resource pool; and then the pointer is pointed to a resource with a minimum sequence number among the sorted resources.

In the above embodiments 1 and 2, value i of the frequency division resources, the time division resources and the code division resources represents an $i^{th}$ resource block.

Figure 3:
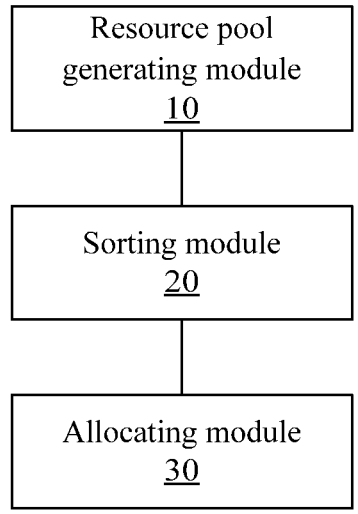
FIG. 3 is a schematic diagram of the structure of a radio resource manager according to an embodiment of the present invention.

FIG. 3 is a schematic diagram of the structure of a radio resource manager according to the embodiment of the present invention.

As shown in FIG. 3, the radio resource manager comprises:
  a resource pool generating module 10, configured to generate a resource pool;
  a sorting module 20, configured to sort PUCCH resources in the resource pool according to a generating sequence of the resources and to make a pointer point to a first PUCCH resource;
  an allocating module 30, configured to allocate a PUCCH resource pointed by the pointer to a terminal and to make the pointer point to a next PUCCH resource.

In the above, the resource pool generating module 10 combines code division resources, frequency division resources and time division resources of a PUCCH to generate the resource pool.

Figure 4:
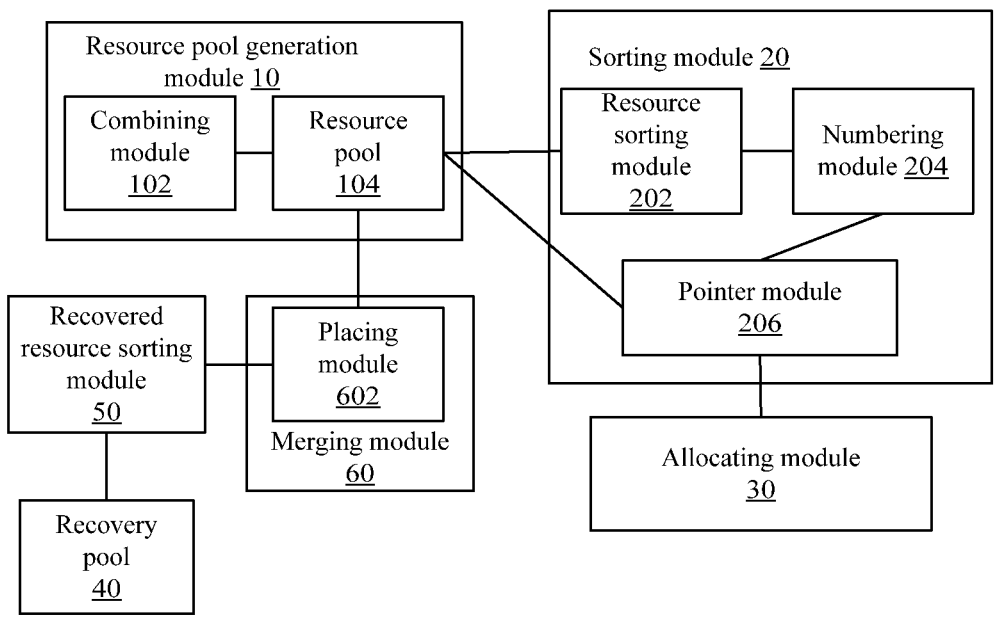
FIG. 4 is a schematic diagram of the structure of a radio resource manager according to a preferred embodiment of the present invention.

Preferably, as shown in FIG. 4, the resource pool generating module 10 comprises:
  a combining module 102, configured to combine, according to the following formula, the code division resources, the frequency division resources and the time division resources which are corresponding to signaling type so as to generate the PUCCH resources S: $S=R*T*U+T*U+U$, or $S=T*R*U+R*U+U$, wherein R is the frequency division resources, T is the time division resources, U is the code division resources, and S is the PUCCH resources.

A resource pool 104, configured to store all the PUCCH resources S generated by the combining module 102.

Preferably, the sorting module 20 comprises: a resource sorting module 202, configured to sort each of the PUCCH resources in the resource pool 104 according to the generating sequence of the resources; a numbering module 204, configured to number the sorted PUCCH resources according to a monotone sequence (a monotone increasing sequence or a monotone decreasing sequence); and a pointer module 206, configured to make the pointer point to a PUCCH resource whose number is an initial number.

Preferably, the radio resource manager also comprises: a recovery pool 40, configured to store PUCCH resources released by terminals.

Preferably, the radio resource manager also comprises: a recovered resource sorting module 50, configured to sort the PUCCH resources in the recovery pool 40 as per the numbers of the resources according to the above monotone sequence (which is identical with the monotone sequence adopted by the numbering module 204) when a amount of PUCCH resources remained in the resource pool reaches a predetermined amount; and a merging module 60, configured to merge the sorted PUCCH resource in the recovery pool 40 into the resource pool 104.

Preferably, the merging module 60 comprises: a placing module 602, configured to place the sorted PUCCH resource in the recovery pool before a PUCCH resource that is in the resource pool and pointed by the pointer currently, wherein the pointer module 206 is also configured to make, after the placing module 602 places the sorted PUCCH resource in the recovery pool before the PUCCH resource that is in the resource pool and pointed by the pointer currently, the pointer point to a first PUCCH resource in a merged resource pool.

Preferably, the way that the recovered resource sorting module 50 judges whether the amount of the PUCCH resources remained in the resource pool 104 reaches the predetermined amount is to judge whether the number of a PUCCH resource pointed by the pointer currently reaches a predetermined number.

It can be concluded from the above description that the present invention achieves the following technical effects.

1. The radio resource manager generates the PUCCH resources in sequence; after one PUCCH resource is allocated to the UE, the pointer is pointed to the next PUCCH resource; and when resources are allocated to the next UE, all that is needed is to allocate the PUCCH resource pointed by the pointer currently to the UE, and it is unnessesary to perform a resource search at each allocation of resource, so that the time for searching resources is saved.

2. The radio resource manager generates the PUCCH resources in sequence according to the method with optimal performance and allocates the resources according to the generating sequence of the resources, therefore the demodulation performance of the physical uplink control channel can be improved.

3. The radio resource manager recovers and sorts the PUCCH resources released by the terminals, so that the demodulation performance of the physical uplink control channel in the system is enabled to be optimal.

Obviously, those skilled in the art shall understand that individual modules and individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or under certain conditions, be executed the shown or described steps in different order; or implemented by making them into integrated circuit module respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for allocating radio resources of a physical uplink control channel (PUCCH), comprising:
   generating, by a radio resource manager, a resource pool;
   sorting, by the radio resource manager, PUCCH resources in the resource pool according to a generating sequence thereof, and making, by the radio resource manager, a pointer point to a first PUCCH resource; and
   allocating, by the radio resource manager, a PUCCH resource pointed by the pointer currently to a terminal and making, by the radio resource manager, the pointer point to a next PUCCH resource,
   wherein the step of sorting, by the radio resource manager, the PUCCH resources in the resource pool according to the generating sequence thereof, and making, by the radio resource manager, the pointer point to the first PUCCH resource comprises:
   sorting, by the radio resource manager, each of the PUCCH resources in the resource pool according to the generating sequence thereof;
   numbering, by the radio resource manager, the sorted PUCCH resources according to a monotone sequence; and
   making, by the radio resource manager, the pointer point to a PUCCH resource whose number is an initial number.

2. The method according to claim 1, wherein the step of the radio resource manager generating the resource pool comprises:
   combining, by the radio resource manager, code division resources, frequency division resources and time division resources of the PUCCH to generate the resource pool.

3. The method according to claim 2, wherein the step of combining, by the radio resource manager, the code division resources, the frequency division resources and the time division resources of the PUCCH to generate the resource pool comprises:
   combining the code division resources, the frequency division resources and the time division resources which are corresponding to a signaling type according to the following formula so as to generate PUCCH resources S:
   $S=R*T*U+T*U+U$, or $S=T*R*U+R*U+U$, wherein R is the frequency division resources, T is the time division resources, U is the code division resources, and S is the PUCCH resources; and
   forming, by all the generated PUCCH resources S, the resource pool.

4. The method according to claim 1, wherein the method further comprises:
    releasing, by the terminal, a PUCCH resource;
    placing, by the radio resource manager, the released PUCCH resources into a recovery pool.

5. The method according to claim 4, wherein the method further comprises:
    when an amount of PUCCH resources remained in the resource pool reaches a predetermined amount, sorting, by the radio resource manager, the PUCCH resources in the recovery pool according to a monotone sequence based on numbers of the resources; and
    merging, by the radio resource manager, the sorted PUCCH resources in the recovery pool into the resource pool.

6. The method according to claim 5, wherein the step of merging, by the radio resource manager, the sorted PUCCH resources in the recovery pool into the resource pool comprises:
    placing, by the radio resource manager, the sorted PUCCH resource in the recovery pool before a PUCCH resource which is in the resource pool and is pointed by the pointer currently; and
    making, by the radio resource manager, the pointer point to a first PUCCH resource in the merged resource pool.

7. The method according to claim 5, wherein the way of judging whether the amount of the PUCCH resources remained in the resource pool reaches the predetermined amount is:
    judging whether a number of a PUCCH resource pointed by the pointer currently reaches a predetermined number.

8. A radio resource manager, comprising:
    a resource pool generating module, configured to generate a resource pool;
    a sorting module, configured to sort each of physical uplink control channel (PUCCH) resources in the resource pool according to a generating sequence thereof, number the sorted PUCCH resources according to a monotone sequence; and make a pointer point to a first PUCCH resource whose number is an initial number; and
    an allocating module, configured to allocate a PUCCH resource pointed by the pointer currently to a terminal and make the pointer point to a next PUCCH resource.

9. The radio resource manager according to claim 8, wherein the resource pool generating module combines code division resources, frequency division resources and time division resources of the PUCCH so as to generate the resource pool.

* * * * *